Aug. 30, 1966  L. C. BLOOM  3,269,756
CONNECTOR FOR TUBING
Filed May 17, 1963
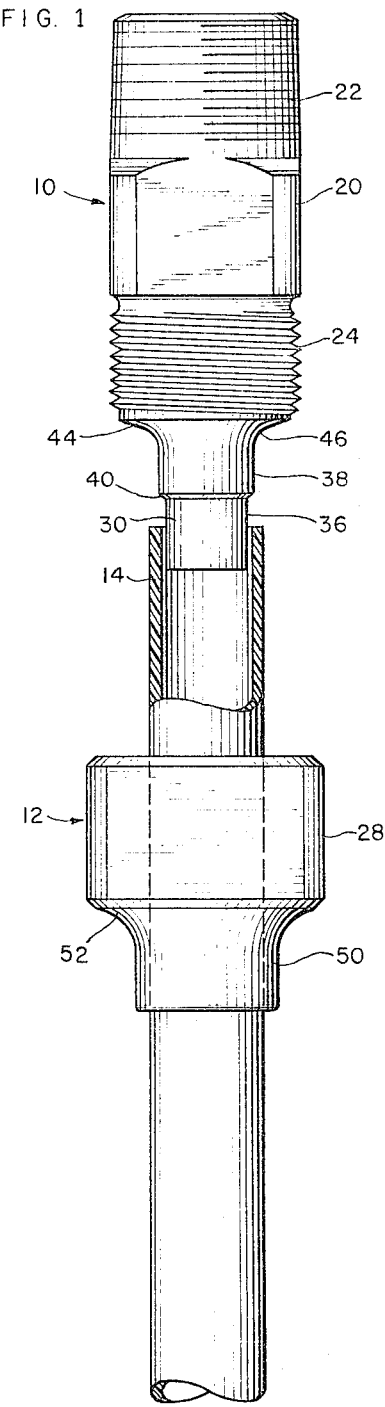
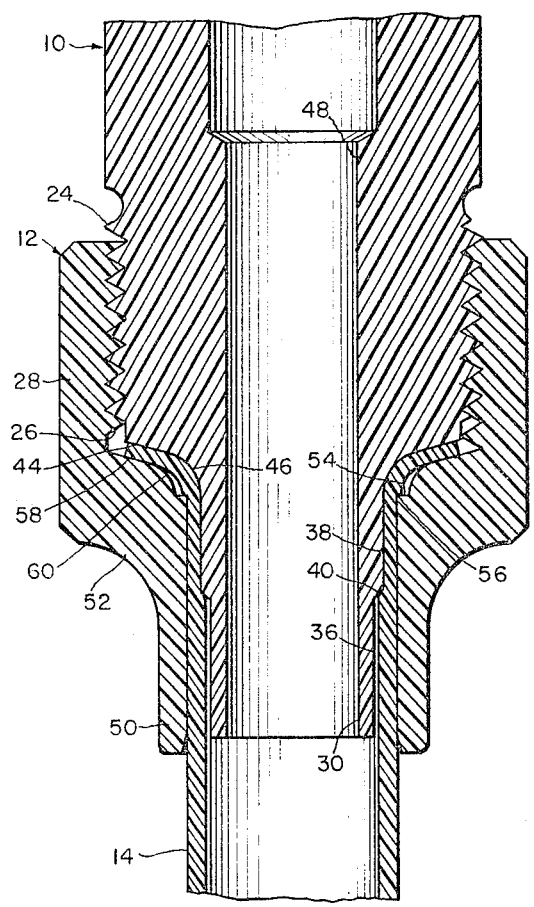
INVENTOR
LESLIE C. BLOOM
BY BUCKHORN, BLORE,
KLARQUIST & SPARKMAN
ATTORNEYS United States Patent Office 3,269,756
Patented August 30, 1966

3,269,756
CONNECTOR FOR TUBING
Leslie C. Bloom, Portland, Oreg., assignor, by direct and mesne assignments, to Bloomco., Inc., Portland, Oreg., a corporation of Oregon
Filed May 17, 1963, Ser. No. 281,249
3 Claims. (Cl. 285—247)

The present invention relates to a connector or coupling and more particularly to a connector or coupling for use with flexible tubing of plastic or like material.

A principal object of the invention is to provide a connector by means of which tubing of synthetic plastic or the like may be repeatedly connected to fittings for the conveyance of fluid to or from the tubing.

Another object is to provide a connector for use with plastic tubing that will not substantially impair the strength of the tubing.

Still another object is to provide a connector which will firmly clamp plastic tubing so as to maintain a fluid tight connection even under substantial fluid pressure.

A further object is to provide a connector that may be easily assembled upon or disassembled from a tubing.

A still further object is to provide a connector of the nature indicated that is of simple construction and inexpensively manufactured.

Another object is to provide a connector for use with flexible tubing that does not require special tools in attachment of the same.

Still other objects and advantages will become more apparent hereinafter.

In accordance with the illustrated embodiment the present invention comprises a connector including a male member and a female member having threaded engaging portions whereby they may be telescoped together. The male member includes a stem portion adapted to be inserted into the tubing to be connected and a flaring shoulder upon which the end of the tubing is forcefully flared during assembly of the members. The female member includes a sleeve portion adapted to encompass the stem and to clamp the tubing thereagainst. The female member also has formed thereon a tubing engaging edge which is adapted to engage the tubing during telescoping of the members and force the end of the tubing onto the shoulder of the male member. The outer portion of such shoulder defines a clamping surface and the female member is provided with a complementary clamping surface between which the end of the tubing is forcefully clamped.

For a more complete description of the invention reference is now made to the accompanying drawing wherein FIG. 1 is a side elevation of a connector made in accordance with the invention showing the same in disassembled condition upon the end of a length of tubing, and FIG. 2 is an enlarged longitudinal section of a connector mounted upon a tubing.

The connector of the invention comprises a male member 10 and a female member 12 adapted to secure between them the end of a length of tubing 14 of a malleable or elastic, flexible material such as rubber, nylon or other like synthetic plastic material.

The male member 10 includes a body portion 20 one end of which is provided with threads 22 or other means for connecting or mounting the member to a fluid conduit or other element to which it is desired to connect the tubing 14. The body portion 20 is also provided with threads 24 for engaging with cooperative threads 26 formed within a tubular body portion 28 of the female member 12. A stem portion 30 extends coaxially from the body portion 20, such stem including a first cylindrical part 36 and a second cylindrical part 38. The end part 36 of the stem is preferably of a diameter slightly less than the inner diameter of the tubing 14 whereby the tubing may be slipped easily over such part. The stem part 38, on the other hand is preferably of slightly larger diameter than the inner diameter of the tubing 14 so that the tubing must be expanded to slip over the part 38. The surface of the stem between the parts 36, 38 is preferably formed as a rather abrupt, inclined shoulder 40 which preferably defines an angle of about forty-five degrees or more with the axis of the member 10.

The member 10 also includes a flaring neck or shoulder extending between the body portion 20 and stem 30. Such shoulder includes an outer frusto conical circumferential clamping portion 44 and a concavely curved inner portion 46 tangential to the portion 44 and to the surface of the stem part 38.

The male member 10 is shown as having a fluid passage 48 therethrough. It will become apparent, however, that the connector could be used simply as an anchor or plugging member and need not necessarily be utilized to make a connection for the passage of fluid.

The female member 12 comprises, in addition to the body portion 28 previously mentioned, a sleeve portion 50 and interconnecting throat portion 52. The sleeve portion 50 has an inner diameter substantially equal to but just slightly greater than the tubing 14 so that it may be slipped manually over such tubing. The inner surface of the sleeve portion 50 is relieved as by forming a circumferential land 54 therein adjacent the throat portion 52 so as to provide the sleeve with a relatively sharp tubing engaging edge 56. The throat portion 52 is formed with an outer, frusto conical clamping surface 58 complementary to the clamping surface 44 and with an inner, convexly curved surface 60 extending from the surface 58 to the bottom of the land 54. Preferably the radius of the surface 60 is substantially less than that of the surface 46 so that such surfaces will be spaced apart a distance greater than the thickness of the tubing wall when the surfaces 44, 58 are in clamping engagement with the end portion of the tubing as shown in FIG. 2.

To mount the connector upon the tubing 14 the female connector is first slipped over the end of the tubing as shown in FIG. 1 and the stem of the male member then inserted into the end of the tubing until the stem part 38 is substantially entirely within the tubing. As will be apparent, in moving the tubing over the part 38 it will be expanded and the shoulder 40 will cause an abrupt rise or shoulder to appear on the exterior surface of the tubing surrounding the shoulder 40. The female member 12 is then moved over the stem and the threads thereof engaged with the threads 26 of the male member. At this point the edge 56 is still positioned over the stem part 36. The female member 12 is then rotated so as to thread the same onto the male member and which effects a telescoping of the members. As this occurs, the edge 56 is moved over the shoulder 40 and will engage the tubing 14 at that point and cause the tubing to move axially with the female member. It was mentioned previously that preferably the shoulder 40 is relatively abrupt. This is for the purpose of causing a somewhat abrupt shoulder to appear in the tubing and which the edge 56 can effectively engage. It has been found that if the shoulder 40 has a long and gentle taper that the edge 56 is not caused to engage a tubing so as to cause it to move axially as is desired. As the tubing is drawn onto the male member the end portion of the tubing which was initially positioned over the stem part 38 is forced over the flaring neck of the male member and is guided by the concave surface 46 to the clamping surface 44. Preferably the stem part 38 has a length substantially equal to the length of surfaces 44, 46 so that when the female member surface 58 is in clamping position relative to the surface 44 the end edge of the tubing is substantially at the peripheral edge of the surface 44 as shown in FIG. 2. The members 10, 12 are tightened upon one another as snugly as desired consistent with needs and materials involved.

The spacing between the surfaces 46, 60 is preferably greater than the tubing wall thickness so as to prevent pinching of the tubing in this area which pinching would prevent or hinder flaring of the tubing over the surface 44.

The spacing between the inner surface of the sleeve portion 50 and the stem part 38 is slightly less than the wall thickness of the tubing 14. It has been found, for example, that in connectors for use with nylon tubing having an inner diameter of 0.250 inch and a wall thickness of about 0.030 inch that the radial spacing between the member surfaces should be about 0.020 inch. Thus the tubing will be clamped snugly against the stem part 38 to help effectuate a fluid tight connection. The flaring of the tubing is important, however, to provide a firm connection of the connector to the tubing. Without a flare it has been found that the tubing will on some occasions pull out of the connector if clamped only between the sleeve and the stem.

The connection may be readily broken by simply unthreading the female member 12 and pulling the tubing off the stem 30. To reconnect, the tubing is slipped over the stem and the operations previously described repeated. If the end of the tubing has been damaged in any way it may simply be cut off and the fresh end engaged in the connector.

The members 10, 12 may be formed of any suitable material. They may be inexpensively molded for example, of thermosetting resins, such as, for example, the polycarbonates sold under the trademark "Lexan," or they may be formed of metal by machining or other suitable process.

Having illustrated and described a preferred embodiment of the invention it should be apparent it permits of modification in arrangement and detail. I claim all such modifications as come within the scope of the appended claims.

I claim:

1. A connector for attachment to the end of a flexible tubing of synethetic plastic or like material and of constant predetermined inner and outer diameters comprising:

a male member including an externally threaded body portion of substantially larger diameter than the tubing to be attached to said connector, said male member also including a stem portion extending coaxially from said body portion, said stem portion comprising a smooth surfaced first cylindrical part adjacent said body portion having a diameter greater than the inner diameter of said tubing but less than the outer diameter of said tubing, said stem portion having a tapering shoulder on the end of said first cylindrical part remote from said body portion to facilitate the insertion of said stem portion into a tubing, said male member having an outwardly flaring neck portion extending from said first part to the periphery of said body portion, said neck portion being concavely curved adjacent to said stem portion and being tangential to said stem portion and defining a circumferential clamping surface on the outer edge of said neck portion, said connector comprising a female member including a body portion having internal threads for cooperative engagement with the threads of said male member body portion and a sleeve portion extending coaxially from said female body portion and adapted to surround said stem portion, said sleeve portion having an inner diameter substantially equal to the outer diameter of said tubing so as snugly to receive said tubing, said female member having a throat extending between the inner surface of said sleeve portion and said female body portion including a clamping surface substantially complementary to the said clamping surface of said neck, said sleeve portion having, at the end thereof adjacent said throat, an abrupt tubing engaging edge defined by said inner surface of said sleeve portion and an annular surface extending substantially perpendicularly to said inner surface, said edge being adapted to engage a tubing advanced onto said male member stem portion and, as said female member is threaded onto said male member, to force said tubing toward and over said male member neck portion thus causing the end portion of said tubing to flare over said neck portion clamping surface whereby said tubing portion may be clamped between said neck portion clamping surface and said female body portion clamping surface.

2. A connector for attachment to the end of a flexible tubing of synthetic plastic or like material and of predetermined inner and outer diameters comprising:

a male member including an externally threaded body portion of substantially larger diameter than the tubing to be attached to said connector, said male member also including a stem portion extending coaxially from said body portion, said stem portion comprising a first cylindrical part adjacent said body portion having a diameter slightly greater than the inner diameter of said tubing and a second cylindrical part of a diameter slightly less than the inner diameter of said tubing, said stem portion having a frusto-conical shoulder extending between said first and said second parts inclined at an angle of about 45 degrees with respect to the axis of said member, said male member having a neck portion extending from said first part to the periphery of said body portion comprising a frusto-conical outer portion and a concavely curved inner portion tangential to the surface of said stem first part and to said outer portion, said neck portion and said stem portion first part being of substantially equal length, said connector comprising a female member including a body portion having internal threads for cooperative engagement with the threads of said male member body portion and a sleeve portion extending coaxially from said female body portion and adapted to surround said stem portion, said sleeve portion having an inner diameter substantially equal to the outer diameter of said tubing so as snugly to receive said tubing, the inner surface of said sleeve portion having a peripheral land formed therein at the end adjacent said female member body portion, said female member having a throat extending between the inner surface of said sleeve portion and said female body portion including an outer, frusto-conical surface complementary to the said frusto-conical outer portion of said neck portion, and a convexly curved transition surface extending between said frusto-conical surface and said land.

3. A connector for attachment to the end of a flexible tubing of synthetic plastic or like material and of constant predetermined inner and outer diameters comprising:

a male member including an externally threaded body portion of substantially larger diameter than the tubing to be attached to said connector, said male member also including a stem portion extending coaxially from said body portion, said stem portion comprising a smooth surfaced first cylindrical part adjacent said body portion having a diameter greater than the inner diameter of said tubing, said stem portion having a tapering shoulder on the end of said first cylindrical part remote from said body portion to facilitate the insertion of said stem portion into a tubing, said male member having an outwardly flaring neck portion extending from said first part to the periphery of said body portion, said neck portion being concavely curved adjacent to said stem portion and being tangential to said stem portion and defining a circumferential clamping surface on the outer edge of said neck portion, said connector comprising a female member including a body portion having internal threads for cooperative engagement with the threads of said male member body portion and a sleeve portion extending coaxially from said female body portion and adapted to surround said stem portion, said sleeve portion having an inner diameter greater than the diameter of said stem portion but less than the sum of said stem diameter and twice the thickness of the wall of said tubing so that a tubing interposed between said stem and sleeve portions will be compressively gripped therebetween, said female member having a throat extending between the inner surface of said sleeve portion and said female body portion including a clamping surface substantially complementary to the said clamping surface of said neck portion, said sleeve portion having, at the end thereof adjacent said throat, an abrupt tubing engaging edge defined by said inner surface of said sleeve portion and an annular surface extending substantially perpendicularly to said inner surface, said edge being adapted to engage a tubing advanced onto said male member stem portion and, as said female member is threaded onto said male member, to force said tubing toward and over said male member neck portion thus causing the end portion of said tubing to flare over said neck portion clamping surface whereby said tubing portion may be clamped between said neck portion clamping surface and said female body portion clamping surface.

References Cited by the Examiner

UNITED STATES PATENTS

| | | | |
|---|---|---|---|
| 597,497 | 1/1898 | Gundermann | 285—334.5 X |
| 1,361,758 | 12/1920 | Ewald | 285—259 X |
| 1,479,917 | 1/1924 | Johnson | 285—259 X |
| 2,290,890 | 7/1942 | Parker | 285—334.5 |
| 2,316,711 | 4/1943 | Parker et al. | 285—334.5 |
| 2,534,198 | 12/1950 | Guarnaschelli | 285—334.5 |
| 2,545,263 | 3/1951 | Corydon | 285—247 |
| 2,551,536 | 5/1951 | Harvey | 285—247 X |
| 2,685,458 | 8/1954 | Shaw | 285—256 X |
| 2,853,320 | 9/1958 | Liebelt et al. | 285—247 |

FOREIGN PATENTS

| | | |
|---|---|---|
| 796,072 | 1/1936 | France. |
| 1,161,614 | 3/1958 | France. |
| 771,824 | 4/1957 | Great Britain. |

CARL W. TOMLIN, *Primary Examiner.*

THOMAS F. CALLAGHAN, *Examiner.*